(12) United States Patent
Tian (10) Patent No.: US 9,881,204 B2
(45) Date of Patent: Jan. 30, 2018

(54) METHOD FOR DETERMINING AUTHENTICITY OF A THREE-DIMENSIONAL OBJECT

(71) Applicant: KABUSHIKI KAISHA TOSHIBA, Tokyo (JP)

(72) Inventor: Guifen Tian, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/061,847

(22) Filed: Mar. 4, 2016

(65) Prior Publication Data
US 2016/0379050 A1    Dec. 29, 2016

(30) Foreign Application Priority Data
Jun. 26, 2015    (JP) .................................. 2015-129044

(51) Int. Cl.
*G06K 9/00*    (2006.01)
(52) U.S. Cl.
CPC ..... *G06K 9/00281* (2013.01); *G06K 9/00288* (2013.01); *G06K 9/00899* (2013.01); *G06K 9/00208* (2013.01); *G06K 9/00214* (2013.01)
(58) Field of Classification Search
USPC ............... 382/118, 181, 154, 218, 190, 149; 345/644; 348/142, 191, E7.085; 353/121
See application file for complete search history.

(56) References Cited

U.S. PATENT DOCUMENTS

| | | | | |
|---|---|---|---|---|
| 7,901,095 B2* | 3/2011 | Xiao | ..................... | H04N 9/3147 345/644 |
| 8,373,752 B2* | 2/2013 | Chen | ....................... | G06T 7/223 348/142 |
| 8,401,253 B2 | 3/2013 | Yamada et al. | | |
| 8,620,066 B2 | 12/2013 | Kozakaya et al. | | |
| 9,600,929 B1* | 3/2017 | Young | ..................... | G06T 17/00 |
| 2012/0027292 A1 | 2/2012 | Kozakaya et al. | | |

FOREIGN PATENT DOCUMENTS

| | | |
|---|---|---|
| JP | 2000-322577 | 11/2000 |
| JP | 2005-209013 | 8/2005 |
| JP | 2007-102601 | 4/2007 |
| JP | 2010231398 A | 10/2010 |
| JP | 2012-069133 | 4/2012 |

\* cited by examiner

*Primary Examiner* — Anh H Do
(74) *Attorney, Agent, or Firm* — Patterson & Sheridan, LLP (57) ABSTRACT

A method for determining authenticity of an object includes, detecting the object included in each of a plurality of two-dimensional images captured at different angles, detecting one or more feature points in the detected object, generating three-dimensional data representing a surface around each of the one or more feature points, generating a similarity value of the generated three-dimensional data relative to referential three-dimensional data, with respect to each of the one or more feature points, and determining whether or not the object is a real object, based on the similarity value generated with respect to each of the one or more feature points.

20 Claims, 9 Drawing Sheets

| FEATURE POINT INDEX | FEATURE POINT NAME | SIGN OF AVERAGE CURVATURE | RANGE OF AVERAGE CURVATURE | SIGN OF GAUSSIAN CURVATURE | RANGE OF GAUSSIAN CURVATURE |
|---|---|---|---|---|---|
| 1 | INNER CORNER OF LEFT EYE | + | | + | |
| 2 | INNER CORNER OF RIGHT EYE | + | | + | |
| 3 | NOSE TIP | − | | + | |
| ... | ... | ... | ... | ... | ... |
| N | ... | ... | ... | ... | ... |

| FACE ORIENTATION EULER ANGLE (α) | FACE ORIENTATION EULER ANGLE (β) | FACE ORIENTATION EULER ANGLE (γ) | DETECTED FEATURE POINT LIST |
|---|---|---|---|
| −30 | −45 | −180 | {0, 0, 1, ..., 0} |
| ... | ... | ... | ... |
| 0 | 0 | 0 | {1, 1, 1, ..., 1} |
| −15 | 0 | 0 | {1, 0, 1, ..., 1} |
| ... | ... | ... | ... |
| 30 | 45 | 180 | |

METHOD FOR DETERMINING AUTHENTICITY OF A THREE-DIMENSIONAL OBJECT

CROSS-REFERENCE TO RELATED APPLICATION

This application is based upon and claims the benefit of priority from Japanese Patent Application No. 2015-129044, filed Jun. 26, 2015, the entire contents of which are incorporated herein by reference.

FIELD

An embodiment described herein relates generally to a method for determining authenticity of a three-dimensional object.

BACKGROUND

An object recognition device has been developed to detect various three-dimensional objects, including a human face. In an object recognition device that detects a human face, it is desired to prevent a picture (i.e., two-dimensional image), a curved picture, or the like from being detected as a real human face. A processing algorithm may be employed to prevent such an issue, which operates to determine whether an image is of a two-dimensional picture or a three-dimensional object, and determine that a real face is captured when the image is determined to be of a three-dimensional object.

In such a processing algorithm, it is desired to further distinguish a curved picture of a three-dimensional object from the object.

DETAILED DESCRIPTION

Embodiments provide a three-dimensional object detection device and a three-dimensional object authentication apparatus capable of determining whether or not a detected object is spoofed by any forms of images via detection the liveness of the object, with high accuracy and through a simple process.

A method for liveness detection of an object includes, detecting the object included in each of a plurality of two-dimensional images captured at different angles, detecting one or more feature points in the detected object, generating three-dimensional data representing a surface around each of the one or more feature points, generating a similarity value of the generated three-dimensional data relative to referential three-dimensional data, with respect to each of the one or more feature points, and determining whether or not the object is a real object, based on the similarity value generated with respect to each of the one or more feature points.

Hereinafter, an embodiment will be described with reference to the drawings.

Figure 1:
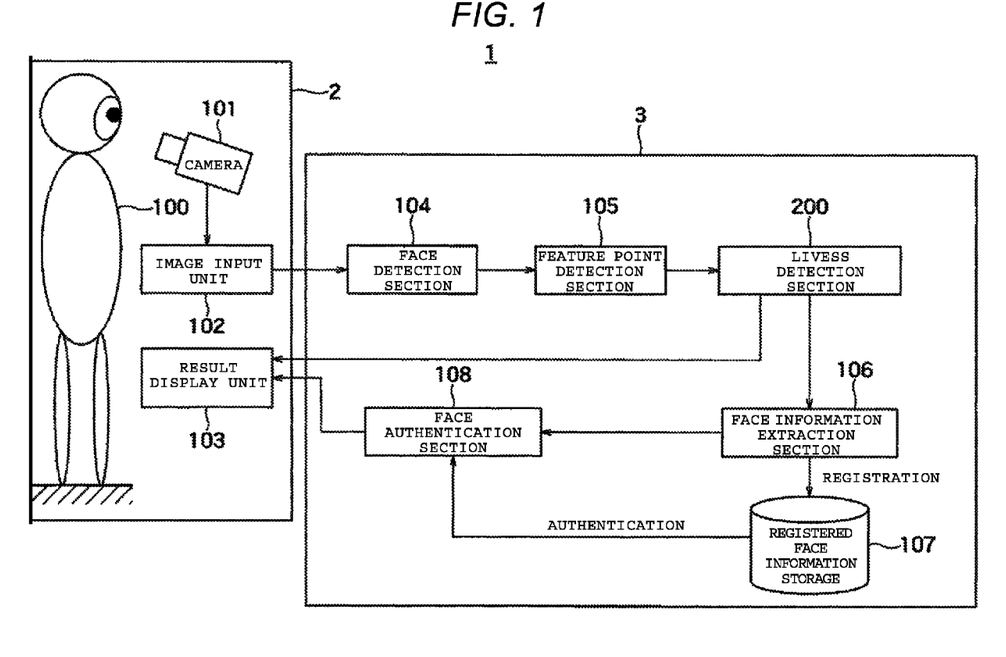
FIG. 1 is a block diagram of a three-dimensional object authentication system according to an embodiment.

FIG. 1 is a block diagram of a three-dimensional object authentication system 1 according to an embodiment. The three-dimensional object authentication system 1 includes an input/output apparatus 2 and a three-dimensional object authentication apparatus 3.

The input/output apparatus 2 includes a camera 101, an image input unit 102, and a result display unit 103. The camera 101 captures an image of a three-dimensional object as a detection target (hereinafter, detection object). Here, the detection object is assumed to be a face of a subject 100. The camera 101 captures images of the subject 100 from different directions and obtains at least two images including the face thereof. Two or more cameras 101 may be provided. Three-dimensional coordinate information of the detection object is obtained based on disparity between coordinates on the two or more images. A specific method of acquiring the three-dimensional coordinate information is arbitrary.

The image input unit 102 inputs the images captured by the camera 101 to the three-dimensional object authentication apparatus 3. The result display unit 103 displays at least one of a determination result of whether or not the face image is an image of a real face and a determination result of whether or not the real face is a face registered in advance.

The three-dimensional object authentication apparatus 3 includes the following hardware elements: a face detection section 104, a feature point detection section 105, aliveness detection section (three-dimensionality detection device) 200, a face information extraction section 106, a registered face information storage 107, and a face authentication section 108. In some embodiments, one or more of these sections, or one or more sub-components within these sections, are implemented as a programmed logic device (e.g., a processor), an application specific integrated circuit (ASIC), or a field programmable gate array (FPGA). The face detection section 104 detects a face region in each of the images input from the image input unit 102. As a face detection process performed by the face detection section 104, a well-known algorithm may be used.

Figure 2:
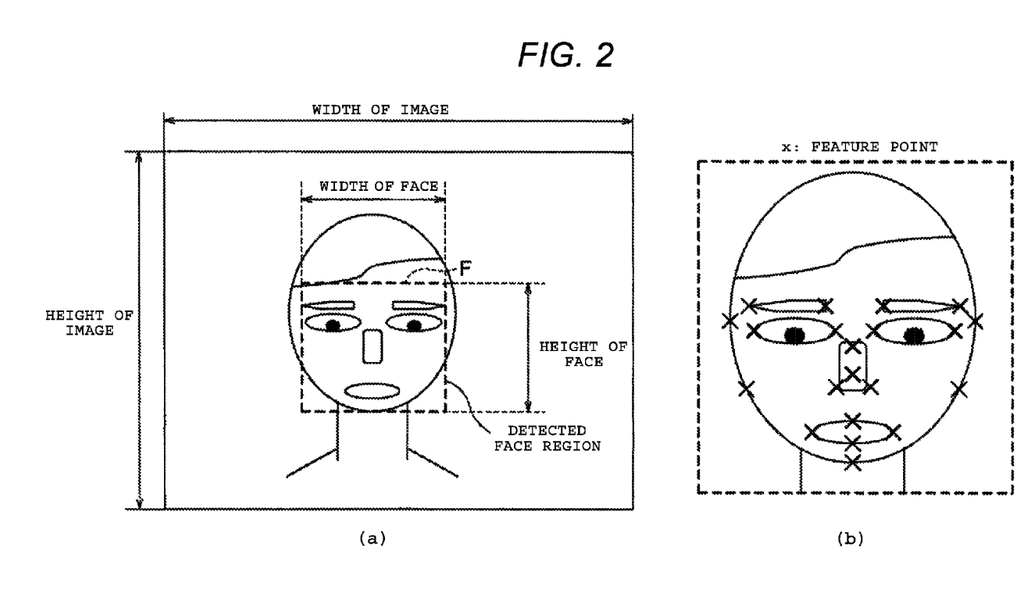
FIG. 2 illustrates an example of detected face region and feature points in the face region by the authentication system.

FIG. 2 illustrates an example of a face region and a detection result of feature points in the face region. Section (a) of FIG. 2 illustrates a face region F detected through the face detection process. The face region F includes face parts that are unique to each person, such as eyes, eyebrows, a nose, and a mouth. A size of the face region F may depend on a forelock, a face direction, or brightness of the face image.

The feature point detection section 105 detects feature points in the face region F. The feature point detection section 105 may detect feature points on a contour line of the face in the face region F. A well-known algorithm may be used for the feature point detection process. For example, pupils and nostril have roughly a circular shape and may thus be detected by using a circular separability filter. An inner corner and an outer corner of the eyes, and a mouth corner may be detected by using a corner detection algorithm. In a case of using such a detection algorithm, the feature point detection section 105 may detect a total of fourteen feature points (two points of the pupils, two points of the eyebrow ends, two points of the inner corners of the eyes, two points of the outer ends of the eyes, two points of the nostrils, one point of the nose tip, two points of the mouth corners, one point of the mouth center) in the face region F.

A heuristic method may be employed in which all face feature points are fit to correct positions by using a dictionary which contains face information stored in advance. In this case, the feature point detection section 105 may detect, in the face region F, for example, a total of twenty-three feature points including not only the above-described fourteen feature points but also feature points of the eyelids and on the face contour line. Section (b) of FIG. 2 exemplifies positions of the feature points (two points of the pupils, four points of the eyebrow ends, two points of the inner corners of the eyes, two points of the outer ends of the eyes, two points of the nostrils, one point of the bridge of nose, one point of the nose tip, two points of the upper and lower mouth centers, two points of the mouth corners, and five points of the contour) by mark "X". This invention takes advantage that characteristics of a three-dimensional shape of a partial region including a certain feature point are roughly the same regardless of subjects. For example, nose tip has shape characteristics unique to the nose tip, and inner corner of eyes has shape characteristics unique to the inner corner of the eyes.

Figure 3:
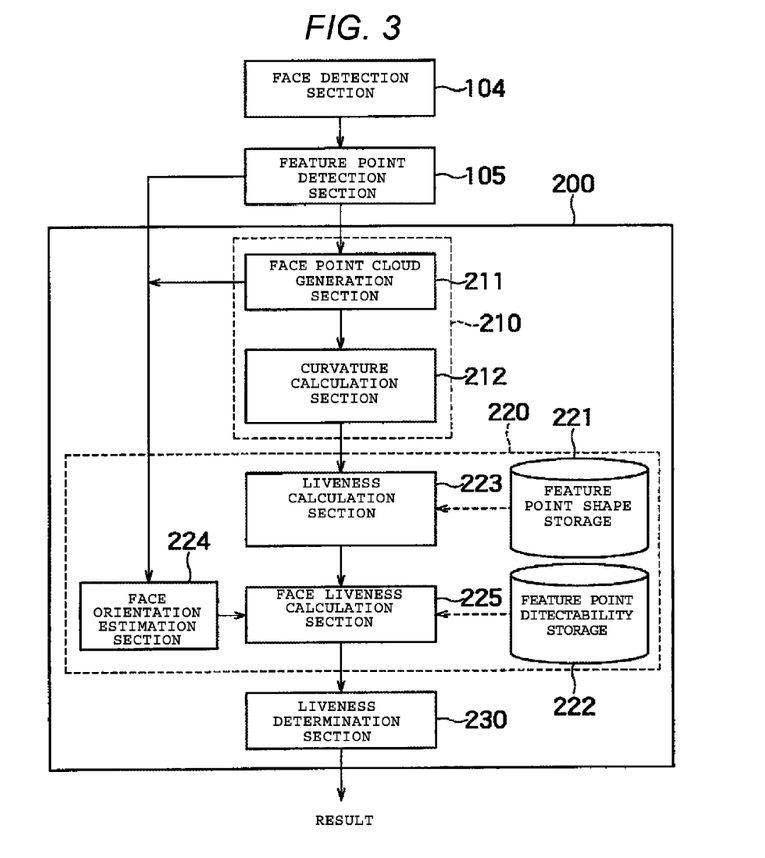
FIG. 3 is a block diagram of a liveness (three-dimensionality) detection device in the authentication system which determines whether an image is from a three-dimensional object.

FIG. 3 is a block diagram of the three-dimensional liveness detection device 200. The liveness detection device 200 includes an acquisition section 210, an evaluation section 220, and aliveness determination section (determination unit) 230. The acquisition section 210 includes a face point cloud generation section 211 and a curvature calculation section 212. The acquisition section 210 calculates feature data of a three-dimensional shape in a partial region including a feature point of a detection object surface. Here, the partial region center shall be a feature point and the feature data of the three-dimensional shape (hereinafter, simply referred to as "feature data" in some cases) indicates characteristics of the three-dimensional shape of the partial region as numerical values. As two feature data items become more similar to each other, characteristics of three-dimensional shapes of corresponding partial regions become more similar to each other.

The acquisition section 210 calculates, as the feature data, a Gaussian curvature and a mean curvature of a partial region centering a feature point therein. The Gaussian curvature and the mean curvature indicate a curved state of the surface in the partial region of the detection object. Based on these two curvatures, whether the surface in the partial region is concave or convex, and to what extent the surface is concave or convex may be specified.

The face point cloud generation section 211 calculates three-dimensional coordinate information of the partial region including a feature point in the face region F based on the disparity between the coordinates in the two images. As described above, the face point cloud generation section 211 converts image pixels corresponding to the partial region into a three-dimensional point cloud. Curvatures are calculated with respect to a consecutive three-dimensional surface. For this reason, the curvature calculation section 212 firstly fits the generated three-dimensional point cloud in the partial region to a consecutive three-dimensional surface. Next, the curvature calculation section 212 calculates a curvature corresponding to the feature point based on the three-dimensional curved surface.

Here, in the present embodiment, the curvature corresponding to a feature point and a curvature of the feature point indicate a curvature of the three-dimensional curved surface in the partial region. In the present embodiment, feature data of a feature point and feature data obtained from the feature point indicate feature data obtained based on the three-dimensional curved surface in the partial region.

The evaluation section 220 includes a feature point shape storage 221, a feature point detectability storage 222, a liveness calculation section 223, a face orientation estimation section 224, and a face liveness calculation section 225. The evaluation section 220 generates an evaluation value of similarity between feature data of the detection object in the partial region and feature data obtained from a partial region of a referential three-dimensional object used as a reference.

The feature point shape storage 221 stores, in advance, information regarding feature points of the referential three-dimensional object. The feature point shape storage 221 stores, for example, feature data for each feature point of a plurality of subjects. Here, the information regarding the feature point is, for example, a distribution range of feature data obtained from a plurality of subjects, with respect to corresponding feature points with each other.

The feature point detectability storage 222 stores information regarding whether or not feature points are able to be detected that vary depending on an angle of the face, by a feature point detection section 105. The liveness calculation section 223 calculates degree of similarity between feature data of a partial region of the detection object and feature data of the corresponding partial region of the referential three-dimensional object, as the liveness of a detection object which may indicate whether or not the detection object is three-dimensional. The liveness is calculated, for example, based on a position where the feature data obtained from the detection object is located in the distribution range of the feature data obtained from a plurality of subjects. In the present embodiment, liveness of a feature point indicates degree of similarity between feature data obtained from the feature point of the detection object and corresponding feature data of the referential three-dimensional object.

The face orientation estimation section 224 estimates the pose of the face imaged by the camera 101. The face liveness calculation section 225 generates an evaluation value obtained by weighting the liveness corresponding to N (where N is an integer of 1 or greater) feature points based on the estimated orientation of the face and the information stored in the feature point detectability storage 222. The liveness determination section 230 determines whether or not the detection object has a predefined three-dimensional shape (for example, a three-dimensional shape of a face) based on the obtained evaluation value.

Figure 4:
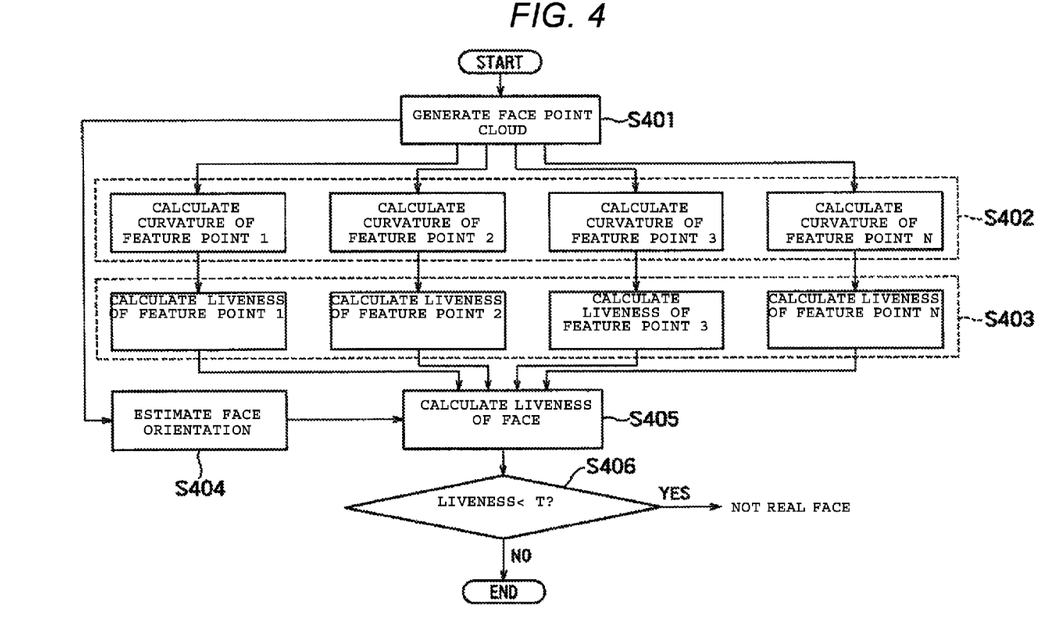
FIG. 4 is a flowchart illustrating an example of a process performed by the liveness detection device.

FIG. 4 is a flowchart illustrating an example of a process performed in the liveness detection device 200. This process is performed on the two images captured by the camera 101. The face point cloud generation section 211 sets N partial regions corresponding to N feature points detected by the feature point detection section 105, on the images. Next, the face point cloud generation section 211 generates three-dimensional coordinates in the N partial regions based on the disparity of the two images (step S401).

Next, the curvature calculation section 212 fits a three-dimensional curved surface to each of the N partial regions based on the generated three-dimensional coordinates. The curvature calculation section 212 calculates N items of feature data (Gaussian curvatures and mean curvatures) based on the N three-dimensional curved surfaces (step S402).

Next, the liveness calculation section 223 retrieves information regarding the feature data which are obtained from the referential three-dimensional object and correspond to the N feature points, from the feature point shape storage 221. The liveness calculation section 223 calculates similarities between the N items of the feature data used as references and the N items of the feature data of the corresponding partial regions, as liveness of detection object (a higher number indicating a higher confidence that the partial region being detected is three-dimensional), respectively (step S403). Here, the process (the curvature calculation and the liveness degree calculation) of the N feature points is performed separately from the other process of the feature points. For this reason, the N feature points may be processed in parallel to each other, and may be sequentially processed.

Next, the face orientation estimation section 224 estimates a face orientation of the detection object (step S404). Next, the liveness of each of the N feature points are aggregated based on the estimated face orientation. Thus, a comprehensive liveness of the entire face is generated as an evaluation value (step S405).

Next, the liveness determination section 230 compares the evaluation value and a predetermined threshold value T (step S406). When the evaluation value is smaller than T (YES in step S406), the detection object is determined to be not have the predefined three-dimensional shape. When the evaluation value is equal to or greater than T (NO in step S406), the detection object is determined to have the predefined three-dimensional shape. In such manner, authenticity of the detection object can be determined.

As described above, the N items of feature data (the Gaussian curvatures and the mean curvatures) are calculated from the image data of the detection object. Next, the liveness of each of the N items of the feature data is obtained. Whether or not the detection object has a predefined three-dimensional shape is determined using the evaluation value obtained by weighting the N three-dimensional liveness.

Next, a process performed by the face point cloud generation section 211 will be described in detail. Two-dimensional image pixels $(I_x, I_y)$ $(L_x \le I_x \le R_x,$ and $L_y \le I_y \le R_y)$ in the detected face region F (coordinates of an upper left corner: $(L_x, L_y)$, and coordinates of a lower right corner: $(R_x, R_y)$) are converted into a three-dimensional point cloud (X,Y,Z).

The conversion into the three-dimensional point cloud, which is a set of three-dimensional coordinates, is performed by using Equation (1).

$$\begin{pmatrix} X \\ Y \\ Z \\ W \end{pmatrix} = Q \times \begin{pmatrix} I_x \\ I_y \\ \text{disparity}(I_x, I_y) \\ 1 \end{pmatrix} \quad (1)$$

Here, $I_x$ and $I_y$ of Equation (1) respectively indicate X and Y coordinates in the two-dimensional image. Disparity$(I_x, I_y)$ indicates disparity (distance) corresponding to the pixel $(I_x, I_y)$. (X/W,Y/W,Z/W) indicates coordinates of a three-dimensional point corresponding to $(I_x, I_y)$ in a world (global) coordinate system, with W a variable the value of which depends on the disparity$(I_x, I_y)$. In such a coordinate system, usually, center of the camera or human eyes is the origin (0, 0, 0), other points have their coordinates based on their physical locations in areal scene (world). Herein and after, all three-dimensional coordinates in this invention means W-divided world coordinates.

Q is a 4×4 perspective projection matrix which transforms disparity of an image pixel to its three-dimensional coordinate. Q is related to camera internal parameters such as focal length, aspect ratio and a distortion coefficient (in a case of using two cameras, a rotation matrix and a translation vector are also related). When a camera is selected, the perspective transform matrix Q may be obtained by executing a general camera calibration algorithm. The face point cloud generation section 211 performs the conversion in Equation (1) for only pixels in the detected face region F, and may thus minimize computation complexity compared with a case where pixels of the entire image are converted.

Next, a process of obtaining feature data in the curvature calculation section 212 will be described in detail. In the present embodiment, at least one feature point is used to determine the authenticity. As a three-dimensional shape of the partial region is more unique in terms of curvature, the higher accuracy of the authenticity determination is. When a plurality of feature points are designated, the determination accuracy further increases.

A curvature is generally calculated for consecutive data. To obtain the curvature, the curvature calculation section 212 first performs polynomial approximation on the discrete three-dimensional point cloud generated by the face point cloud generation section 211 so as to fit the discrete cloud to a three-dimensional curved surface. A curvature corresponding to the feature point is obtained by using coefficients representing the three-dimensional curved surface.

Figure 5:
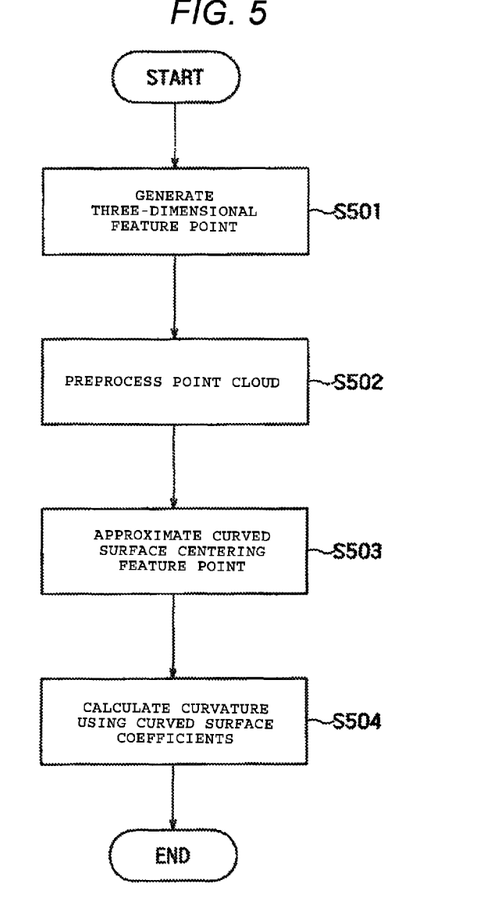
FIG. 5 is a flowchart illustrating an example of a process of obtaining curvature as shape feature data for a feature point.

FIG. 5 is a flowchart illustrating an example of a process of obtaining a curvature as feature data. First, as a three-dimensional feature point, three-dimensional coordinates corresponding to a feature point with two-dimensional coordinates on the image are calculated (step S501). Three-dimensional coordinates (CX,CY,CZ) are acquired according to Equations (2) to (4) using two-dimensional coordinates $(A_x, A_y)$ of a feature point A $(1 \le A \le N)$ in the image under the world coordinate system. In Equations (2) to (4), Q is the 4×4 perspective projection matrix of Equation (1), Q[ ][ ] indicates elements of the perspective projection matrix, and disparity$(A_x, A_y)$ indicates disparity (distance) of the feature point A.

$$CX = (A_x - Q[0][3])/(\text{disparity}(A_x, A_y) \times Q[3][2] + Q[3][3]) \quad (2)$$

$$CY = (A_y - Q[1][3])/(\text{disparity}(A_x, A_y) \times Q[3][2] + Q[3][3]) \quad (3)$$

$$CZ = Q[2][3]/(\text{disparity}(A_x, A_y) \times Q[3][2] + Q[3][3]) \quad (4)$$

Next, before the three-dimensional point cloud is approximated to a curved surface, a pre-processing may be performed on the three-dimensional point cloud (step S502). For example, one of a process of down-sampling the three-dimensional point cloud and a process of smoothing a noisy three-dimensional point cloud can be performed. When the three-dimensional point cloud is down-sampled, the computational complexity required to approximate the three-dimensional point cloud to a curved surface may be reduced. When the noisy point cloud is smoothed, approximation accuracy may be increased. As long as determination accuracy and processing speed are satisfied, pre-processing of point cloud may not be performed.

Next, surface approximation is performed on the preprocessed three-dimensional coordinates (step S503). The surface approximation is performed by using p ($p \leq m \times n$) three-dimensional points ($x_i, y_i, z_i$) (where $0 \leq i \leq p$), which originally are two-dimensional image pixels located in a rectangular region (partial region). The rectangle region represents a partial region of a face, with m and n being the horizontal width and vertical height and a feature point as its center. Values of m and n may be set in accordance with a real size of a facial part which is with an actual feature point as center. When the difference between a real size of an actual facial part and a size of a set partial region increases, calculation accuracy of the curvature may decrease. This may negatively influence accuracy of the authenticity determination. Therefore, m and n shall be defined using Equation (5).

$$m = \text{fit\_w} \times \text{avg\_depth}/\text{baseline}, \quad n = \text{fit\_h} \times \text{avg\_depth}/\text{baseline} \quad (5)$$

In Equation (5), avg_depth is disparity of face region F. In addition, fit_w and fit_h are (unit: mm) width and height of a facial part which is a representative of a feature point. Further, baseline is a distance (unit: mm) between lenses of two cameras. Regarding to the size of the facial part, for example, a size of the human nose is roughly 36 mm×36 mm, disparity of face region F may be an average value of the disparity of all image pixels in the region, and thus the number of three-dimensional points in the partial region automatically changes in accordance with an imaging distance of the face region F.

The curved surface approximation is performed using Equation (6).

$$z_i(X_i,Y_i) = a + b \times (x_i - CX) + c \times (y_i - CY) + d \times (x_i - CX) \times (y_i - CY) + e \times (x_i - CX)^2 + f \times (y_i - CY)^2 \quad (6)$$

In Equation (6), the coefficient a is a fixed value, and the coefficients b, c and d are first derivatives of the approximated surface at a feature point (CX,CY,CZ). The coefficients e and f are second derivatives at feature point (CX, CY,CZ) of the same surface. In order to obtain the coefficients, Equation (6) is converted into a form of matrix calculation of Equation (7).

$$\begin{pmatrix} 1 & x_0 - CX & y_0 - CX & (x_0 - CX)(y_0 - CY) & (x_0 - CX)^2 & (y_0 - CY)^2 \\ 1 & x_1 - CX & y_1 - CX & (x_1 - CX)(y_1 - CY) & (x_1 - CX)^2 & (y_1 - CY)^2 \\ \vdots & \vdots & \vdots & \vdots & \vdots & \vdots \\ 1 & x_p - CX & y_p - CX & (x_p - CX)(y_p - CY) & (x_p - CX)^2 & (y_p - CY)^2 \end{pmatrix} \times \begin{pmatrix} a \\ b \\ c \\ d \\ e \\ f \end{pmatrix} = \begin{pmatrix} z_0 \\ z_1 \\ \vdots \\ z_p \end{pmatrix} \quad (7)$$

In Equation (7), since the coordinates ($x_i, y_i, z_i$) (where $0 \leq i \leq p$) of each of the p three-dimensional points and the feature point (CX,CY,CZ) are known, vector $(a,b,c,d,e,f)^T$ may be resolved optimally via least squares.

Next, curvature is calculated based on the approximated surface (step S504). A Gaussian curvature and a mean curvature of the three-dimensional feature point are calculated using the coefficients {a, b, c, d, e, and f}. The mean curvature is calculated using Equation (8), and the Gaussian curvature is calculated using Equation (9).

$$H(CX,CY,CZ) = [(1+c^2) \times e - b \times c \times d + (1+b^2) \times f]/(1+b^2+c^2)^{1.5} \quad (8)$$

$$K(CX,CY,CZ) = (4 \times e \times f - d^2)/(1+b^2+c^2)^2 \quad (9)$$

As described above, the curvature calculation section 212 obtains the approximated surface based on the three-dimensional point cloud in the partial region including the feature point. The Gaussian curvature and the mean curvature are obtained as feature data using the coefficients of the curved surface. The curvature calculation section 212 processes only feature points having apparent three-dimensional curvature, and may thus largely reduce computational complexity compared with a case where all image pixels of the face region F are processed. As feature points with strong three-dimensional shape, for example, the left and right inner corners of the eyes, the nose tip, central points of upper and lower lips, and the bridge of nose may be used. In this case, high authenticity detection accuracy may be achieved. Calculation of curvatures of the aforementioned feature points located at the centers of the face varies little with reference to face orientation. For this reason, when the feature points located at the centers of the face are used, the curvatures of the feature points can be calculated invariantly to the orientation of the face.

Figure 6:
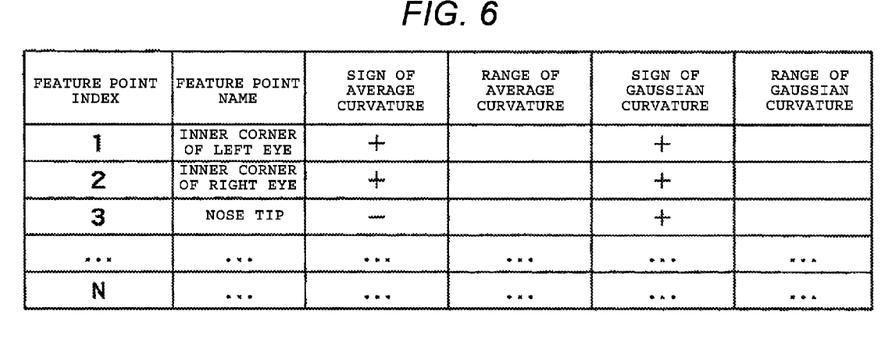
FIG. 6 illustrates an example of shape information stored in storage unit of the liveness detection device regarding the shape feature data of several detected feature points.

Next, information regarding feature data of a three-dimensional shape stored in the feature point shape storage 221 will be described in detail. FIG. 6 illustrates an example of shape information regarding feature data. The feature point shape storage 221 stores shape information regarding feature data of a three-dimensional shape illustrated in a table in FIG. 6. In FIG. 6, an index of a single feature point and information regarding feature data thereof are depicted in a single row. The shape information regarding the feature data includes {a feature point index, a feature point name, a (plus or minus) sign of the mean curvature, a range of the mean curvature, a (plus or minus) sign of the Gaussian curvature, and a range of the Gaussian curvature}. Here, the partial region centered at the feature point is considered to be either a convex or a concave. Therefore, a sign of the mean curvature and a sign of the Gaussian curvature included in the shape information regarding the feature data can be decided as prior knowledge according to its corresponding feature point.

Next, the range of the mean curvature and the range of the Gaussian curvature included in the shape information regarding the feature data will be described in detail. A range of a curvature of each feature point is acquired through the following process. First, face images of D (where H is an integer of 1 or greater, the larger the more generic of the range) subjects are captured by the camera 101. Next, the face images of each subject are processed by the face detection section 104 and the feature point detection section 105 so that feature points of each face image are detected.

Next, the detected face region and feature points of each subject are input to the face point cloud generation section 211 and the curvature calculation section 212, so that mean curvatures and the Gaussian curvatures of N feature points are calculated. Here, D mean curvatures and D Gaussian curvatures may be obtained for each feature point. Then, the maximum value and the minimum value of the mean curvatures and the Gaussian curvatures are obtained for each feature point. The obtained [minimum value, maximum value] are used to define the range of the mean curvatures and the Gaussian curvatures of each feature point. Here, signs of the mean curvature and the Gaussian curvature of each feature point are predefined as plus or minus. When signs of a mean curvature and a Gaussian curvature of a certain feature point do not match the predefined signs, information regarding the mean curvature and the Gaussian curvature thereof are excluded.

Figure 7:
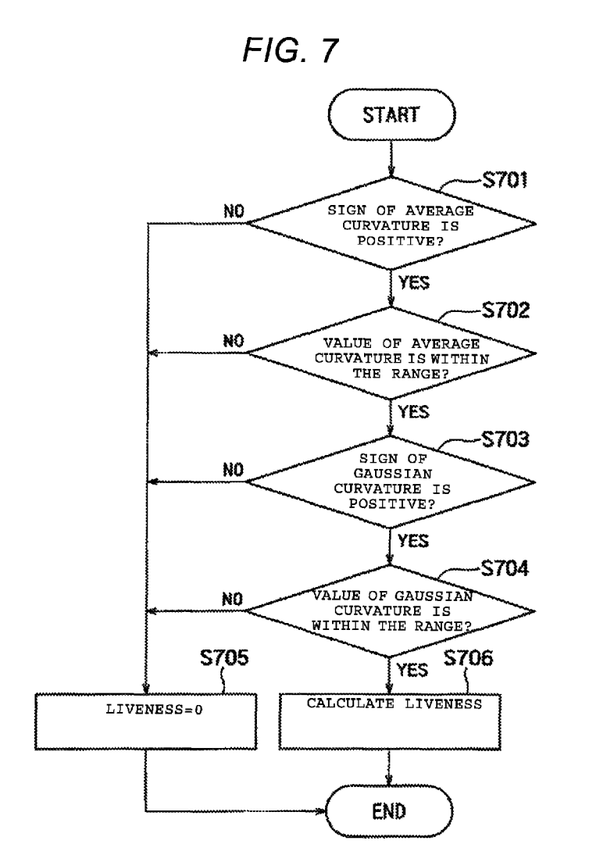
FIG. 7 is a flowchart illustrating an example of a process of calculating the liveness of an image by referring to the shape information.

The shape information regarding the feature data obtained in the above-described manner is stored in the feature point shape storage 221. The shape information may be stored in the feature point shape storage 221 in advance before the three-dimensional object authentication system 1 is activated. The number of shape information pieces may be changed depending on the algorithm used in liveness detection device 200. When H is 1, the ranges of the average curvature and the Gaussian curvature are set as NULL. Next, a process performed by the liveness calculation section 223 will be described in detail. FIG. 7 is a flowchart illustrating an example of a process of calculating a liveness of three-dimensional feature point. The liveness calculation section 223 receives shape information regarding feature data corresponding to a feature point j (j is feature point index with 1≤j≤N) calculated by the curvature calculation section 212, and reads the shape information regarding the feature data corresponding to the feature point index j from the feature point shape storage 221. The liveness calculation section 223 determines whether or not the following four conditions are satisfied.

First, it is determined whether or not a sign of a mean curvature $H_j$ of the calculated feature point j is the same as the sign of the read mean curvature (step S701). Next, it is determined whether or not a value of the mean curvature $H_j$ of the calculated feature point j is included in the range ($T1_j$, $T2_j$) of the read mean curvature (step S702). Next, it is determined whether or not a sign of a Gaussian curvature $K_j$ of the calculated feature point j is the same as the sign of the read Gaussian curvature (step S703). Next, it is determined whether or not a value of the Gaussian curvature $K_j$ of the calculated feature point j is included in a range ($K1_j$, $K2_j$) of the read Gaussian curvature (step S704).

When one of the four conditions is not satisfied, the feature data of the calculated feature point j is determined as not being similar to the read feature data. In this case, a liveness $Score_j$ indicating similarity of feature data is set as zero (step S705).

On the other hand, when the four conditions are all satisfied it is determined that shape characteristics of a partial region are similar to the shape characteristics of the corresponding partial region of the stored referential faces. In this case, a liveness $Score_j$ indicating similarity between calculated feature data of a detection target and feature data of the referential feature point j is calculated using Equation (10) (step S706). As described above, the liveness calculation section 223 calculates the liveness $Score_j$ indicating the degree of similarity between the referential feature data and the feature data of the detection target in terms of three-dimensionality.

$$Score_j = \frac{H_j - T1_j}{T2_j - T1_j} \times 0.5 + \frac{K_j - K1}{K2_j - K1_j} \times 0.5 \quad (10)$$

The liveness $Score_j$ shows a greater value as the mean curvature $H_j$ approaches $T2_j$ within the range ($T1_j$, $T2_j$) of the mean curvature. On the other hand, liveness $Score_j$ decreases as the mean curvature $H_j$ approaches $T1_j$ within the same range. Similarly, liveness $Score_j$ also shows a greater value as the Gaussian curvature $K_j$ approaches $K2_j$ within the range ($K1_j$, $K2_j$) of the Gaussian curvature. On the other hand, $Score_j$ decreases as the Gaussian curvature $K_j$ approaches $K1_j$ within the range ($K1_j$, $K2_j$) of the Gaussian curvature.

As described above, as the feature data of the feature point j has a sign which is predefined in accordance with the feature point, the liveness $Score_j$ becomes closer to 1 as the mean curvature approaches $T2_j$ and the Gaussian curvature approaches $K2_j$. On the other hand, $Score_j$ becomes closer to 0 as the mean curvature becomes apart from $T2_j$ and the Gaussian curvature becomes apart from $K2_j$.

When D is 1, NULL is set as [minimum value, maximum value], and thus Equation (10) needs not be used. In this case, when the feature data of the feature point j has a sign exactly the same as the sign predefined in accordance with the feature point, $Score_j$ is set as 1, and, when not, $Score_j$ is set as 0.

As a value of the feature data of the referential feature point j becomes closer to a value of the feature data of the feature point j of the detection target, characteristics of three-dimensional shapes become more similar to each other. Thus, as $Score_j$ becomes closer to 1, a partial region corresponding to the feature point j of the detection target has more similar shape characteristics. For this reason, as $Score_j$ becomes closer to 1, it is more likely that the partial region of detection object is genius instead of a spoofing by pictures.

Next, an estimation process performed by the face orientation estimation section 224 will be described in detail. The face orientation estimation section 224 estimates the orientation of a face three-dimensional coordinates obtained using Equations (2) to (4) and a two-dimensional generic frontal face model with feature points in ground-truth position. The three-dimensional coordinates of detected feature points is projected to a random two-dimensional plane and a sum of squares of distances between coordinates of the projected feature points and that of ground-truth may be calculated. The aforementioned process may be executed iteratively until a minimum is obtained. When a minimum is achieved, the face orientation estimation section 224 obtains the projection matrix corresponding to minimum sum as a result of orientation estimation.

The estimated orientation is represented by Euler angles (α,β,γ). Empirically, ranges of Euler angles which can be accurately estimated using the coordinates of feature points are −30≤α≤30, −45≤β≤45, and −180≤γ≤180. α indicates up-and-down (roll), β indicates left-and-right (pitch), and γ indicates in-plain rotational angle of a face(yaw), respectively.

Figure 8:
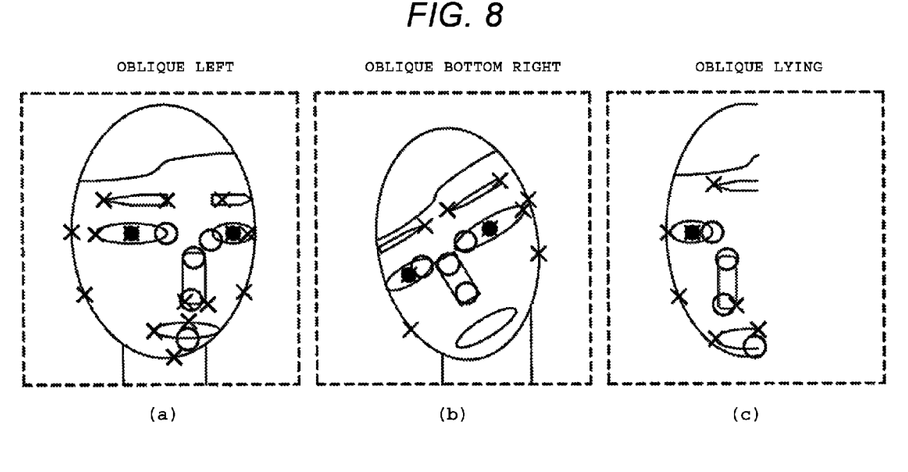
FIG. 8 illustrates examples of feature points detected from a face image in three different face angles.

In order to calculate the face liveness from integrating individual liveness of partial regions of detection target, the confidence of individual liveness need to be evaluated. As depicted in FIG. 8, face orientation greatly affects feature point detection. FIG. 8 exemplifies feature points which are detected according to different face orientations. In FIG. 8, feature points detected in three patterns of face orientations are indicated by mark "X" or "O". In (a) of FIG. 8, the face is near frontal and is directed obliquely to the left, and almost all face feature points are detected. In (b) of FIG. 8, the face is directed obliquely to the lower right, and a part of face contour and nostrils is not detected. In (c) of FIG. 8, the face further obliquely lies, and more than half of the feature points are not detected.

In the present embodiment, the evaluation of individual liveness is performed by weighting liveness and weight depends on how correctly a feature point centered in the partial region is detected. For this reason, the feature point detectability storage 222 stores information including various face orientations ($\alpha,\beta,\gamma$) as well as whether or not feature points are able to be detected under the orientations ($\alpha,\beta,\gamma$).

Figure 9:
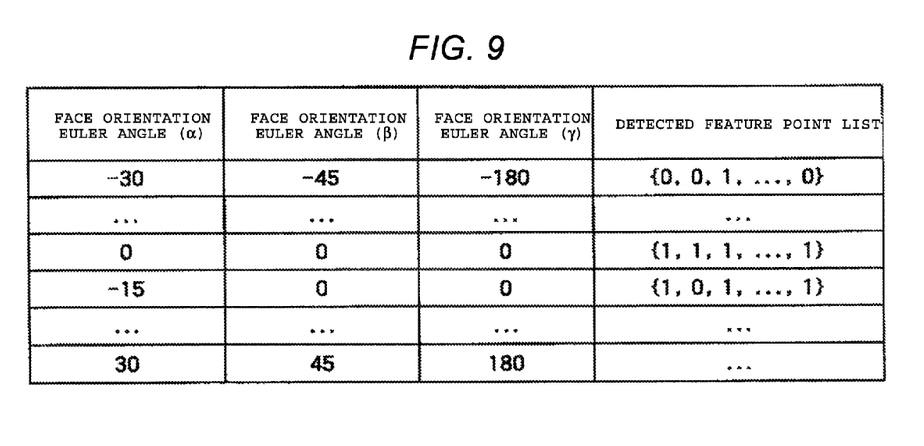
FIG. 9 exemplifies information regarding detectability of feature points with respect to various angles stored in a storage unit of the liveness detection device.

FIG. 9 illustrates an example of stored information. In each row in FIG. 9, an orientation in the range of $-30 \leq \alpha \leq 30$, $-45 \leq \beta \leq 45$, $-180 \leq \gamma \leq 180$ together with a feature point list which represents detectability of N features are stored. The feature point list stores a detected feature point by a value of 1 and a non-detected feature point by 0. Here, the length of a list equal to number of feature points N.

Next, the calculation of face liveness by the face liveness calculation section 225 will be described in detail. In a case where only a single feature point is used, the face liveness calculation section 225 uses the liveness calculated by Equation (10) as the final face liveness. On the other hand, in a case of employing a plurality of feature points, the face liveness calculation section 225 weights the liveness of each feature point according to Equation (11).

$$\text{Score} = \Sigma_{j=1}^{N} \text{weight}_j \times \text{Score}_j \quad (11)$$

In Equation (11), Score is the face liveness, $\text{weight}_j$ indicates a weight of the feature point j, and $\text{Score}_j$ indicates liveness of the feature point j. In addition, $\text{weight}_j$ is calculated using Equation (12). In Equation (12), $\cos(V,V_a)$ is an inner product between a face orientation vector V estimated by the face orientation estimation section 224 and an orientation vector $V_a$ (where $0 \leq a \leq r$) stored in the feature point detectability storage 222, and indicates a distance between the vectors. Here, a is a row number and $V_a$ is the row's corresponding face orientation, and r corresponds to the total number of stored rows in the feature point detectability storage 222 and is a natural number of 1 or greater.

$$0 \leq \text{weight}_j = \frac{\sum_{a=0}^{a=r} \text{match}(j,a) \times \cos(V,V_a)}{\sum_{a=0}^{a=r} \text{match}(j,a)} \leq 1 \quad (12)$$

Here, match(j,a) is a function, and, when the j-th term of the feature point list in the a-th row is 1, match(j,a) is 1. On the other hand, when the j-th term is 0, match(j,a) is 0. In addition, $\cos(V,V_a)$ is an inner product between the vectors V and $V_a$ and indicates a distance therebetween. The face liveness calculation in Equation (12) takes into account of variations in face orientation. Thus, even when a detection target takes orientation in various directions, accuracy of the impersonation determination may be prevented from decreasing.

Even when a part of a detection target is not imaged by the camera 101, the authenticity determination may be performed by using three-dimensional liveness corresponding to detected feature points. When only a few face feature points less variant or invariant to face orientation are utilized, $\text{weight}_j$ may be set to a same value (for example, 1) as shown in Equation (13) regardless of the face orientation. Consequently, the face lieveness of detection target can be more easily but also robustly calculated. For example, the five points located in the central part of the face marked by "O" in FIG. 8 (inner corners of the left and right eyes, bridge of nose, nose tip, lower lip center) may be used to calculate the face liveness with high precision by Equation (13).

$$\text{Score} = \Sigma_{j=1}^{N} \text{Score}_j \quad (13)$$

The liveness determination section 230 determines whether or not the face in the image is authentic based on face liveness (Score in Equation (11) or (13)). When Score is equal to or more than a threshold value T, the detection target is determined to be a real object and thus authentic. When Score is equal to or less than T, the detection target is determined to be not authentic. Here, the threshold value T may be changed depending on the number of feature points used to obtain the evaluation value Score.

When it is determined that the detection target is not authentic (i.e., not a real face), the result display unit 103 displays that the face is not authentic. In addition, when a signal indicating that the face is not authentic is input, the input/output apparatus 2 may alert or reject the user of the three-dimensional object authentication apparatus 3.

On the other hand, when it is determined that the detection target is authentic (i.e., a real face), the face authentication section 108 determines whether or not the face (authentication face) imaged by the camera 101 is a face (registered face) registered in the registered face information storage 107. More specifically, the face information extraction section 106 extracts feature data (face information) from the face region F which is detected by the face detection section 104. The face authentication section 108 determines whether or not the face information regarding the authentication face, extracted from the face information extraction section 106 corresponds to any one of faces registered in the registered face information storage 107 in advance. When the authentication is successful, the result display unit 103 displays that the authentication face is a registered face on a display device of the result display unit 103.

As a method of extracting face information in the face information extraction section 106, a general algorithm may be used. For example, feature data may be calculated using Gabor wavelet transform. First, a region centered at a feature point is cropped from a face image at multiple scales and in a plurality of orientations. Next, one-dimensional Gabor wavelet transform is performed in horizontal direction to obtain transformed data of both low-frequency high-frequency. Similarly, one-dimensional Gabor wavelet transform is performed in a vertical direction. As a result, transformed data at different scales and orientations may be obtained.

The aforementioned transformed data may be used as feature data. The number of scales and orientations of the Gabor wavelet transform may be determined based on requirement in terms of authentication accuracy and processing speed of actual face authentication. Feature data as face information may be calculated using other general methods such as DCT transform, Eigen Face, and local binary pattern (LBP) in addition to the Gabor wavelet transform.

The registered face information storage 107 extracts and registers face information regarding a registered face image of a user using the face information extraction section 106. When the detection target is authenticated as a registered face (authentication is successful), the face information stored in the registered face information storage 107 may be updated by adding face information of the detection target.

As described above, an evaluation value may be obtained which indicates similarity between feature data indicative of shape characteristics of a partial region in the three-dimensional face region F of a detection target and referential feature data indicative of shape characteristics of a partial region including feature points. The partial region centered at a feature point has unique characteristic in terms of three-dimensional shape. Thus, when an evaluation value indicating a high similarity is obtained, there is a high possibility that a detection target is three-dimensional. In contrast, in the case of all pixels in a face region are evaluated, no matter that the vast majority has little even no three-dimensional characteristic, it is hard and much more computationally expensive for the authenticity detection. For this reason, it is advantageous to evaluate only feature points which are with apparent three-dimensional shape instead of whole pixels in the face region in which most pixels have little shape characteristic.

When a plurality of feature points is used for an evaluation value, whether or not partial regions corresponding to the feature points are similar to the referential partial regions of these feature pints may be determined. For this reason, determination accuracy may further increase compared to the case of using only a single feature point. Besides, the orientation of a detection target are taken into account of in the calculation of an evaluation value, the evaluation value is orientation invariant. Thus, the authenticity determination of in-plain rotating face and out-of-plain oblique face at any angles may be addressed. In addition, compared to evaluation of every pixel in a face region, the authenticity determination of this invention is computational inexpensive and thus the present embodiment is applicable to a system which requires low power consumption.

As described above, according to the embodiment, feature data of a three-dimensional shape in a partial region centered at a feature point of a detection object is acquired. Based on an evaluation value of similarity with feature data of a three-dimensional shape obtained from a corresponding partial region of a referential three-dimensional object surface, whether or not the detection object has a predefined three-dimensional shape is determined. When the referential three-dimensional object is a facial image, whether or not the detection object has a predefined three-dimensional shape is determined. Consequently, even when an evaluation value is not calculated via processing the pixels of an entire detection object, whether or not the detection object is authentic (i.e., a real face) may be determined simply by evaluating the feature face in some particular pixels (partial regions). According to the embodiment, although a face is used as an example of a detection object, is only an example, and is not intended to limit a detection object to a face.

As described above, according to the present embodiment, an acquisition region of feature data indicating shape characteristics is restricted to a partial region centered at a feature point, and thus determination of whether or not a detection object is authentic may be performed rapidly and with high accuracy. Consequently, a three-dimensional object authentication system which may accurately determine whether or not a detection object is authentic may be provided.

At least apart of the three-dimensional object detection device and the three-dimensional object authentication system according to the embodiment may be configured by using hardware, and may be configured by using software. When the software is used, a program achieving at least some functions of the three-dimensional object detection device and the three-dimensional object authentication system may be recorded on a recording medium such as a flexible disc or a CD-ROM, and may be executed by a computer (processor) reading the program. The recording medium is not limited to an attachable and detachable medium such as a magnetic disk or an optical disc, and a fixed recording medium such as a hard disk device or a memory may be used.

The program achieving at least some functions of the three-dimensional object detection device, and the three-dimensional object authentication system may be distributed via a communication channel (including wireless communication) such as the Internet. The program may be in a state of being encrypted, modulated, or compressed to be distributed through a wired or a wireless channel such as internet or distributed by being stored in recording medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for determining authenticity of an object using a computing device, comprising:
  detecting, by the computing device, the object included in each of a plurality of two-dimensional images captured at different angles;
  detecting, by the computing device, one or more feature points in the detected object;
  generating, by the computing device, three-dimensional data representing a surface around each of the one or more feature points;
  generating, by the computing device, an evaluation value indicating a similarity of the generated three-dimensional data relative to referential three-dimensional data, with respect to each of the one or more feature points; and
  determining, by the computing device, whether or not the object is a real object, based on the evaluation value generated with respect to each of the one or more feature points.

2. The method according to claim 1, wherein the generating of the evaluation value includes steps of:
  generating, by the computing device, curvature of a surface around each of the one or more feature points based on the generated three-dimensional data;
  retrieving, by the computing device, a referential curvature of a surface around each of the one or more feature points in the referential three-dimensional data, which is stored in a data storage; and
  comparing the curvature and the referential curvature.

3. The method according to claim 1, further comprising:
  determining, by the computing device, an orientation of the object based on the generated three-dimensional data; and
  multiplying, by the computing device, a weighting factor that varies according to the orientation, to each of the evaluation values, wherein
  whether or not the object is a real object is determined based on the evaluation value multiplied by the weighting factor.

4. The method according to claim 1, wherein the determining of whether or not the object is a real object includes steps of:

generating, by the computing device, an overall evaluation value between the object and a referential object based on the evaluation value of each of the one or more feature points; and determining, by the computing device, whether or not the overall evaluation value is greater than a predetermined threshold.

5. The method according to claim 1, further comprising:
when it is determined that the object is a real object, determining, by the computing device, whether or not the object is one of previously registered objects.

6. The method according to claim 1, further comprising:
when it is determined that the object is not a real object, generating, by the computing device, a signal that causes a display to display information indicating that the object is not a real object.

7. The method according to claim 1, wherein the object is a human face, and the feature points include positions of face parts.

8. A non-transitory computer readable medium comprising a program that is executable in a computing device to cause the computing device to perform a method for determining authenticity of an object, the method comprising:
detecting the object included in each of a plurality of two-dimensional images captured at different angles;
detecting one or more feature points in the detected object;
generating three-dimensional data representing a surface around each of the one or more feature points;
generating an evaluation value of the generated three-dimensional data relative to referential three-dimensional data, with respect to each of the one or more feature points; and
determining whether or not the object is a real object, based on the evaluation value generated with respect to each of the one or more feature points.

9. The non-transitory computer readable medium according to claim 8, wherein the generating of the evaluation value includes steps of:
generating curvature of a surface around each of the one or more feature points based on the generated three-dimensional data;
retrieving a referential curvature of a surface around each of the one or more feature points in the referential three-dimensional data, which is stored in a data storage; and
comparing the curvature and the referential curvature.

10. The non-transitory computer readable medium according to claim 8, wherein the method further comprises:
determining an orientation of the object based on the generated three-dimensional data; and
multiplying a weighting factor that varies according to the orientation, to each of the evaluation values, wherein whether or not the object is a real object is determined based on the evaluation value multiplied by the weighting factor.

11. The non-transitory computer readable medium according to claim 8, wherein the determining of whether or not the object is a real object includes steps of:
generating an overall evaluation value between the object and a referential object based on the evaluation value of each of the one or more feature points; and
determining whether or not the overall evaluation value is greater than a predetermined threshold.

12. The non-transitory computer readable medium according to claim 8, wherein the method further comprises:
when it is determined that the object is a real object, determining whether or not the object is one of previously registered objects.

13. The non-transitory computer readable medium according to claim 8, wherein the method further comprises:
when it is determined that the object is not a real object, generating a signal that causes a display to display information indicating that the object is not a real object.

14. The non-transitory computer readable medium according to claim 8, wherein the object is a human face, and the feature points include positions of face parts.

15. A three-dimensional object detection system, comprising:
an image capturing unit configured to capture a plurality of two-dimensional images of an object at different angles;
a processor configured to:
detect the object included in each of the plurality of two-dimensional images,
detect one or more feature points in the detected object,
generate three-dimensional data representing a surface around each of the one or more feature points,
generate an evaluation value of the generated three-dimensional data relative to referential three-dimensional data, with respect to each of the one or more feature points, and
determine whether or not the object is a real object, based on the evaluation value generated with respect to each of the one or more feature points; and
a data storage for storing the referential three-dimensional data.

16. The three-dimensional object detection system according to claim 15, wherein
the processor is configured to generate the evaluation value by steps including:
generating curvature of a surface around each of the one or more feature points based on the generated three-dimensional data;
retrieving a referential curvature of a surface around each of the one or more feature points in the referential three-dimensional data, which is stored in a data storage; and
comparing the curvature and the referential curvature.

17. The three-dimensional object detection system according to claim 15, wherein
the processor is further configured to:
determine an orientation of the object based on the generated three-dimensional data, and
multiply a weighting factor that varies according to the orientation, to each of the evaluation values, and
whether or not the object is a real object is determined based on the evaluation value multiplied by the weighting factor.

18. The three-dimensional object detection system according to claim 15, wherein
the processor is configured to determine whether or not the object is a real object by steps including:
generating an overall evaluation value between the object and a referential object based on the evaluation value of each of the one or more feature points; and
determining whether or not the overall evaluation value is greater than a predetermined threshold.

19. The three-dimensional object detection system according to claim 15, wherein the processor is further configured to determine whether or not the object is one of previously registered objects, when it is determined that the object is a real object.

20. The three-dimensional object detection system according to claim 15, further comprising:
a display, wherein
the processor is further configured to generate a signal that causes the display to display information indicating that the object is not a real object, when it is determined that the object is not a real object.

* * * * *